United States Patent [19]
Kipping

[11] Patent Number: 5,984,288
[45] Date of Patent: Nov. 16, 1999

[54] DEVICE FOR CLAMPING PARTS, IN PARTICULAR METAL SHEETS, IN A WELDING OR MOUNTING LINE

[75] Inventor: Josef Kipping, Schmelz, Germany

[73] Assignee: Thyssen Industrie AG, Essen, Germany

[21] Appl. No.: 08/981,666

[22] PCT Filed: Apr. 3, 1996

[86] PCT No.: PCT/EP96/01457

§ 371 Date: Mar. 10, 1998

§ 102(e) Date: Mar. 10, 1998

[87] PCT Pub. No.: WO96/38265

PCT Pub. Date: Dec. 5, 1996

[30] Foreign Application Priority Data

Jun. 1, 1995 [DE] Germany .................. 295 09 049 U

[51] Int. Cl.$^6$ .................................................. B23Q 3/08
[52] U.S. Cl. ................... 269/25; 269/45; 269/43
[58] Field of Search .................. 269/45, 71, 75, 269/20, 25, 82–85

[56] References Cited

U.S. PATENT DOCUMENTS

| | | | |
|---|---|---|---|
| 688,230 | 12/1901 | Isgrig et al. | 269/45 |
| 2,497,943 | 2/1950 | Ingwer . | |
| 4,214,739 | 7/1980 | Dailey | 269/75 |
| 5,280,892 | 1/1994 | Smith | 269/75 |

FOREIGN PATENT DOCUMENTS

| | | |
|---|---|---|
| 84 27 261 | 1/1985 | Germany . |
| 1 466 434 | 3/1977 | United Kingdom . |

*Primary Examiner*—Robert C. Watson
*Attorney, Agent, or Firm*—McGlew and Tuttle, P.C.

[57] ABSTRACT

A device for clamping parts, in particular metal sheets, in a motor vehicle mounting line, has a console, a support for the parts that may be secured on a top stop of the console, and a pneumatic clamping device that actuates a pressure piece that can be clamped against the parts mounted on the support. In order to obtain a console made of a few components with various spatial positions of the clamping point between the support and the pressure piece, at its base the console has a clamping block and a centering piece for a stay that can be secured thereon, and the top stop acts with its bottom side as a centering element for the stay that can be secured thereon.

18 Claims, 4 Drawing Sheets

DEVICE FOR CLAMPING PARTS, IN PARTICULAR METAL SHEETS, IN A WELDING OR MOUNTING LINE

FIELD OF THE INVENTION

The present invention pertains to a device for clamping components with a bracket, a support that can be fastened to an upper abutment of the bracket for the components, and a pneumatic tensioner, which is held at the abutment of the bracket and actuates a pressure piece that can be tensioned against the components located on the support. The components are in particular metal plates within a motor vehicle assembly line.

BACKGROUND OF THE INVENTION

Such devices are used especially in the manufacture of bodies in the automobile industry to automatically clamp metal plates to be welded to one another. A plurality of such devices are arranged within an assembly line. Each of these devices must be designed according to the necessary spatial arrangement of the metal plates to be clamped. This is expensive.

SUMMARY AND OBJECTS OF THE INVENTION

The primary object of the present invention is therefore to improve a device of the class described in the introduction such that the bracket can be manufactured from a few components according to various spatial arrangements of the clamping site between the support and the pressure piece.

This object is accomplished by the bracket having a clamping frame on the foot side and a centering piece for a prop that can be fastened thereto and by the abutment being provided on the underside with a centering for the prop that can be fastened thereto. The bracket of the device is manufactured according to the present invention from a plurality of prefabricated components. The components may be arranged and aligned in relation to one another such that the clamping site between the support and the pressure piece assumes the actually necessary position. In particular, the prop may be manufactured from a semifinished material, which is cut to the needed length. All this leads to a substantial simplification of the manufacture and to a reduction of the costs associated with it.

The clamping frame should preferably have a vertical junction surface for the centering piece. The centering piece for the prop can thus be fastened to this vertical junction surface in different angular positions, so that the prop can be aligned, if needed, not only vertically, but also at an angle to the vertical.

In combination with this or independently from this, the clamping frame may also have a junction surface sloping against the vertical for the centering piece, so that there is an additional degree of freedom for the arrangement of the centering piece.

For embodiments in which the alignment of the prop remains unchanged, the clamping frame and the centering piece may also have a one-piece design.

In a preferred embodiment of the present invention, the prop is a pipe, especially precision steel pipe. To center this pipe, the centering piece and the abutment should have centering surfaces, which extend in parallel to the longitudinal axis of the prop or the pipe.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
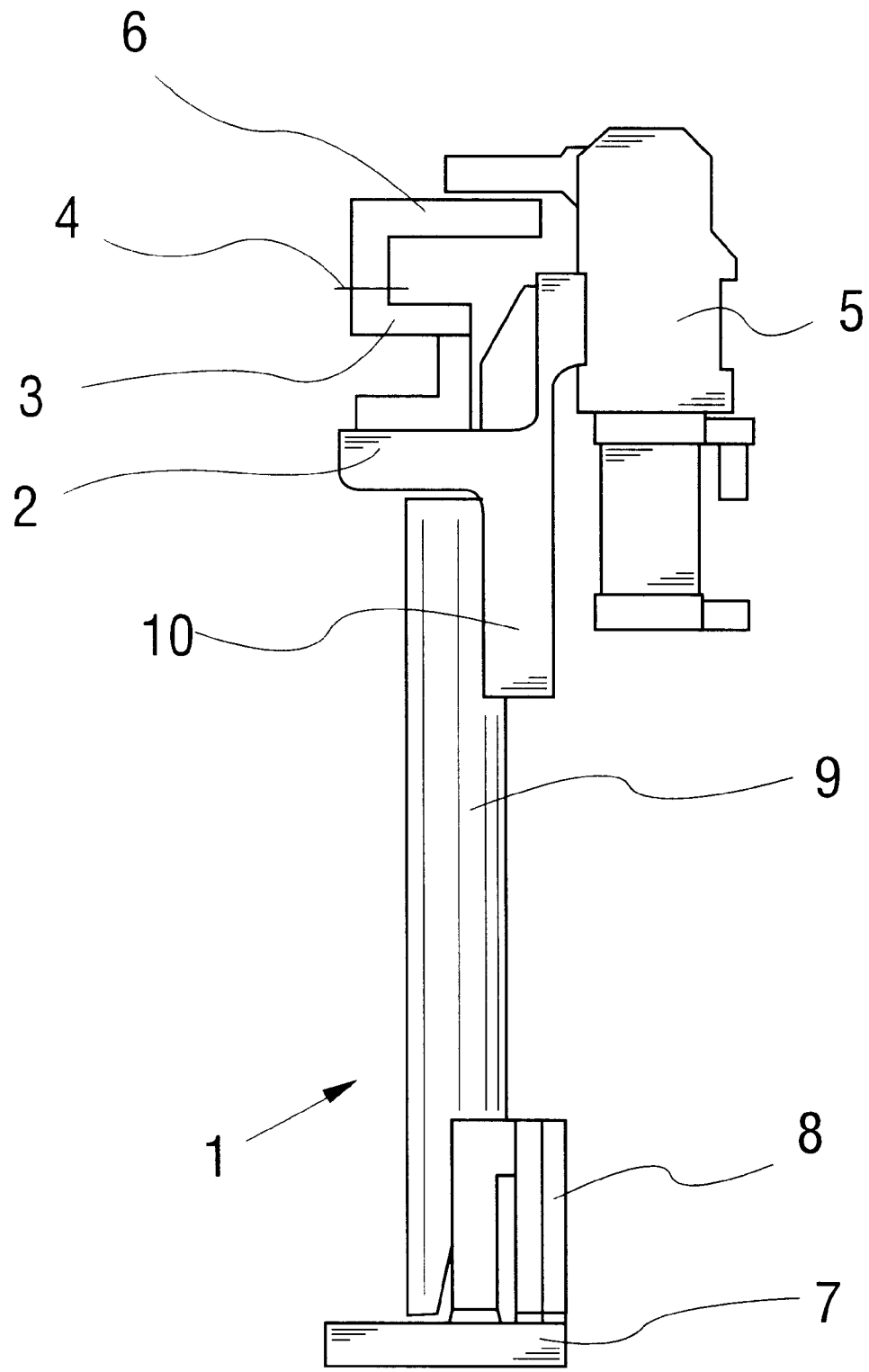
FIG. 1 is a schematic side view of a device for clamping components.

The device shown in the drawing is used to clamp metal plates within a motor vehicle assembly line. In its basic design, it comprises a bracket 1, which can be fastened to a foundation, not shown, and carries on the top side an abutment 2, on which a support 3 for the components 4 to be clamped is fastened. A pneumatic tensioner 5, which actuates a pressure piece 6 tensioning the components 4 against the support 3, is fastened to the abutment 2 on the side.

In the embodiment shown, the bracket 1 comprises individual components connected to one another, namely, a foot-side clamping frame 7, a centering piece 8, a prop or stay 9, and a centering 10 for the prop 9 joining the abutment 2 on the underside.

In the exemplary embodiments shown, the prop 9 comprises a precision steel pipe, which is cut to the needed length. The centering piece 8 and the centering 10 of the abutment 2 have centering surfaces 11, which are adapted to the diameter of the prop 9 and extend in parallel to the axis of the pipe. All the components described so far may be screwed together or welded to one another.

Figure 2:
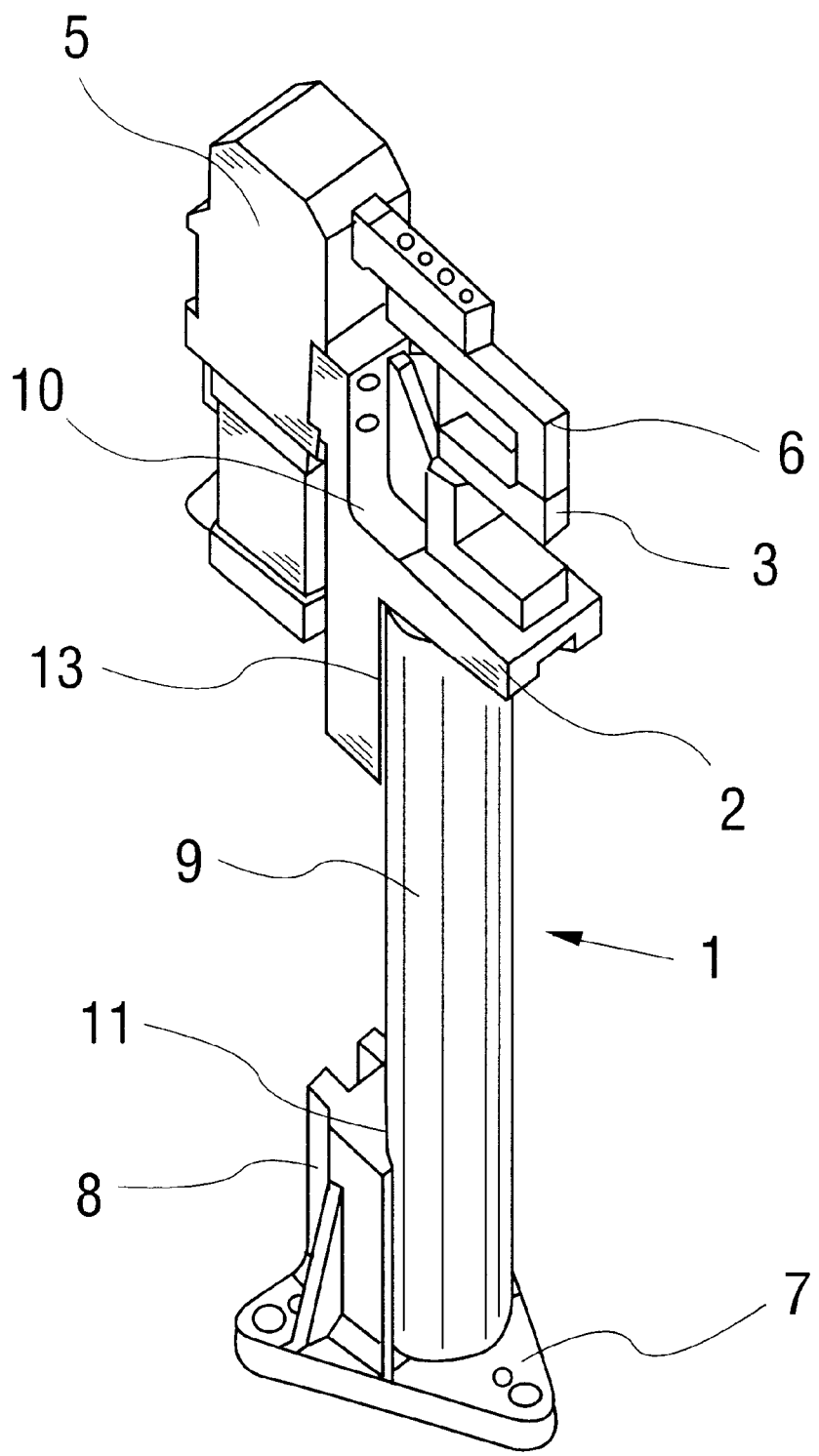
FIG. 2 is a perspective view of the object according to FIG. 1.

In the embodiment shown in FIGS. 1 and 2, the clamping frame 7 and the centering piece 8 form a single component. The centering surfaces 11 of the centering piece 8 and of the centering 10 at the abutment 2 extend in the vertical direction, so that the bracket 1 is aligned vertically.

Figure 3:
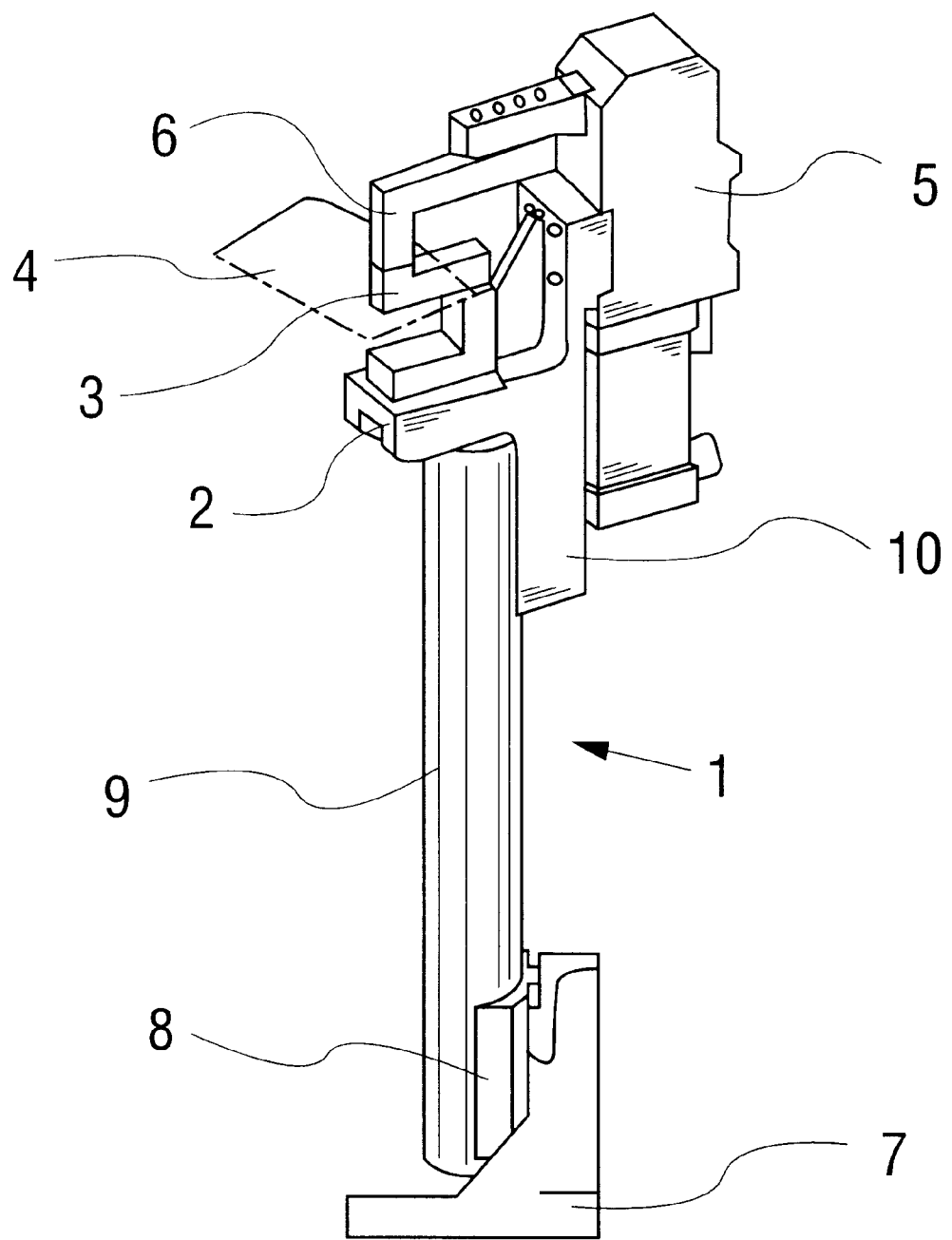
FIG. 3 is a schematic side view of another embodiment of the object according to FIG. 1.
Figure 4:
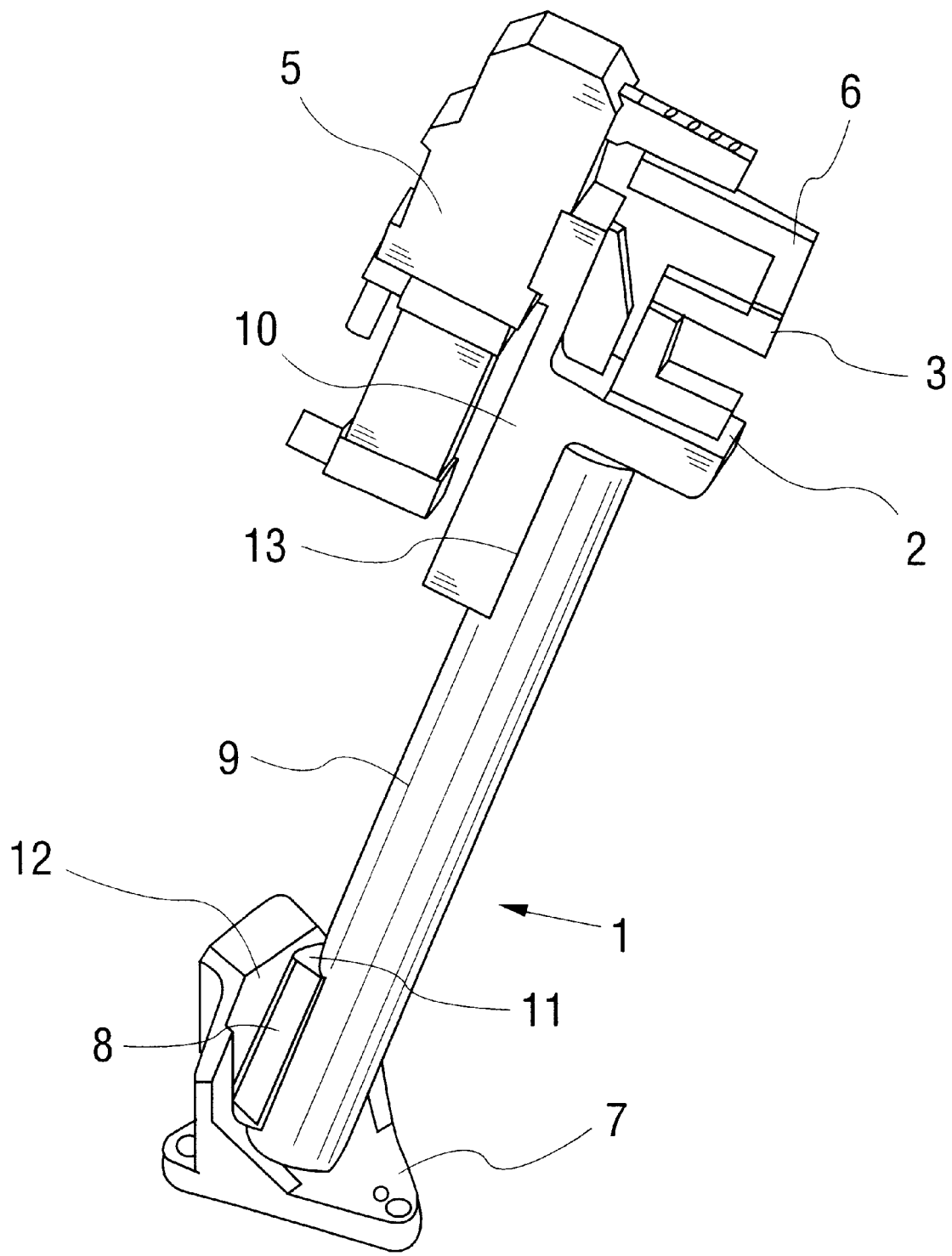
FIG. 4 is a perspective view of the object according to FIG. 3.

In the embodiment shown in FIGS. 3 and 4, the clamping frame 7 and the centering piece 8 are components that are independent from one another. The clamping frame 7 has a vertical junction surface 12, to which the centering piece 8 can be fastened in different angular positions. The clamping frame 7 additionally has another clamping surface 13, which is sloped against the vertical and to which the centering piece 8 may optionally likewise be fastened in different angular positions. Correspondingly, the bracket 1 may be aligned in space already at the time of the manufacture of the device according to the spatial position of the clamping site between the support 3 and the pressure piece 6.

The features described in the abstract, the patent claims, the description and those features presented in the drawing can prove essential both singly and in arbitrary combinations to the realization of the invention.

While specific embodiments of the invention have been shown and described in detail to illustrate the application of the principles of the invention, it will be understood that the invention may be embodied otherwise without departing from such principles.

---

APPENDIX

List of Reference Numbers

1 Bracket
2 Abutment
3 Support
4 Components
5 Pneumatic tensioner
6 Pressure piece
7 Clamping frame
8 Centering piece
9 Prop
10 Centering
11 Centering surfaces
12 Junction surface
13 Sloped junction surface

---

I claim:

1. A clamping device for clamping metal plate components along an assembly, the device comprising:

a prop with a longitudinal axis;

an abutment on one end of said prop, said abutment including an abutment centering means for aligning the position of said abutment with said prop to provide an abutment and prop alignment and for fastening said abutment with said prop based on said abutment and prop alignment, said abutment centering means having a centering surface extending in parallel to said longitudinal axis;

a support connected to said abutment, said support providing a supporting surface for the metal plate components;

a pneumatic tensioner connected to said abutment and having a pressure piece, said pneumatic tensioner tensioning said pressure piece against the metal plate components on said support;

a clamping frame positioned at another end of said prop, said clamping frame having a foot for mounting on a foundation;

a foot centering means connected to said clamping frame and said prop for aligning said prop to provide a clamping frame and prop alignment and for fastening said clamping frame with said prop based on said abutment and prop alignment, said foot centering means having a centering surface extending in parallel to said longitudinal axis of said prop.

2. A device in accordance with claim 1, wherein:

said clamping frame has a vertical junction surface for connecting with said foot centering means.

3. A device in accordance with claim 1, wherein:

said clamping frame has a junction surface angularly spaced from vertical for connecting with said foot centering means.

4. A device in accordance with claim 1, wherein:

said clamping frame and said foot centering means are made in one piece.

5. A device in accordance with claim 1, wherein:

said prop is a pipe.

6. A device in accordance with claim 2, wherein:

said prop is a pipe.

7. A device in accordance with claim 3, wherein:

said prop is a pipe.

8. A device in accordance with claim 4, wherein:

said prop is a pipe.

9. A device in accordance with claim 1, wherein:

said foot centering means aligns said prop with said foot clamp in a predetermined position.

10. A device in accordance with claim 1, wherein:

said centering surfaces of said abutment and foot centering means are in contact with said prop.

11. A device in accordance with claim 1, wherein:

said foot clamping frame has a junction surface;

said foot centering means has a junction surface connectable with said junction surface of said foot clamping means in a plurality of positions.

12. A device in accordance with claim 11, wherein:

said junction surfaces of said foot clamping means and said foot centering means are flat.

13. A device in accordance with claim 12, wherein:

said prop is cylindrical;

said foot centering means aligns said prop with said foot clamp in a predetermined position;

said abutment centering means aligns said prop with said abutment in a predetermined position;

said centering surfaces of said abutment and foot centering means are in contact with said prop wherein said prop may be exchanged with a similar prop of a different axial length based on said centering surfaces.

14. A clamping device for clamping metal plate components along an assembly line, the device comprising:

a prop with a longitudinal axis;

an abutment on one end of said prop, said abutment including an abutment centering means for aligning the position of said abutment with said prop to provide an abutment and prop alignment and for fastening said abutment with said prop based on said abutment and prop alignment, said abutment centering means having a centering surface extending in parallel to said longitudinal axis;

a support connected to said abutment, said support providing a supporting surface for the metal plate components;

a pneumatic tensioner connected to said abutment and having a pressure piece, said pneumatic tensioner tensioning said pressure piece against the metal plate components on said support;

a clamping frame positioned at another end of said prop, said clamping frame having a foot for mounting on a foundation;

a foot centering device connected to said clamping frame and said prop for aligning said prop to provide a clamping frame and prop alignment and for fastening said clamping frame with said prop based on said abutment and prop alignment, said foot centering means having a centering surface extending in parallel to said longitudinal axis of said prop, said centering surfaces providing said abutment and prop alignment and said clamping frame and prop alignment allowing supports of different lengths to be interchanged to vary a distance between said abutment and said clamping frame while maintaining said abutment and prop alignment for a predetermined abutment and said clamping frame position.

15. A device in accordance with claim 14, wherein:

said clamping frame has a vertical junction surface for connecting with said foot centering means.

16. A device in accordance with claim 14, wherein:

said clamping frame has a junction surface angularly spaced from vertical for connecting with said foot centering means.

17. A device in accordance with claim 14, wherein:

said clamping frame and said foot centering means are made in one piece.

18. A device in accordance with claim 14, wherein:

said prop is a pipe.

* * * * *